United States Patent
Kawase et al.

(10) Patent No.: US 11,245,104 B2
(45) Date of Patent: Feb. 8, 2022

(54) BATTERY

(71) Applicant: Panasonic Intellectual Property Management Co., Ltd., Osaka (JP)

(72) Inventors: Akira Kawase, Osaka (JP); Yasutaka Tsutsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 220 days.

(21) Appl. No.: 16/129,897

(22) Filed: Sep. 13, 2018

(65) Prior Publication Data

US 2019/0097208 A1    Mar. 28, 2019

(30) Foreign Application Priority Data

Sep. 25, 2017 (JP) .............................. JP2017-183142

(51) Int. Cl.
| | | |
|---|---|---|
| *H01M 4/04* | (2006.01) | |
| *H01M 4/52* | (2010.01) | |
| *H01M 10/0562* | (2010.01) | |
| *H01M 10/058* | (2010.01) | |
| *H01M 4/525* | (2010.01) | |
| *H01M 4/66* | (2006.01) | |
| *H01M 10/052* | (2010.01) | |
| *H01M 10/04* | (2006.01) | |

(Continued)

(52) U.S. Cl.
CPC ......... *H01M 4/0404* (2013.01); *H01M 4/525* (2013.01); *H01M 4/661* (2013.01); *H01M 10/0472* (2013.01); *H01M 10/052* (2013.01); *H01M 10/058* (2013.01); *H01M 10/0562* (2013.01); *H01M 10/0585* (2013.01); *H01M 50/183* (2021.01); *H01M 50/20* (2021.01); *H01M 50/209* (2021.01); *H01M 2004/021* (2013.01); *H01M 2300/0068* (2013.01)

(58) Field of Classification Search
CPC .. H01M 4/0404; H01M 2/08; H01M 10/0472; H01M 50/183
See application file for complete search history.

(56) References Cited

U.S. PATENT DOCUMENTS

2017/0373300 A1    12/2017 Maeda et al.

FOREIGN PATENT DOCUMENTS

| JP | 2008-103292 | 5/2008 |
|---|---|---|
| JP | 2010-277907 | 12/2010 |

(Continued)

*Primary Examiner* — Ula C Ruddock
*Assistant Examiner* — Frank A Chernow
(74) *Attorney, Agent, or Firm* — McDermott Will and Emery LLP

(57) ABSTRACT

A battery includes an electricity-generating element that includes an electrode layer and a counter-electrode layer, an electrode current collector that is disposed in contact with the electrode layer, a counter-electrode current collector that is disposed in contact with the counter-electrode layer, and a first sealing section that includes a first portion and a second portion. In the battery, the first portion is positioned within an opposing region where the electrode current collector and the counter-electrode current collector oppose each other and is in contact with the electrode current collector and the counter-electrode current collector. In addition, the second portion is positioned outside the opposing region, and the second portion is positioned outside both an edge of the electrode current collector and an edge of the counter-electrode current collector.

10 Claims, 13 Drawing Sheets

(51) Int. Cl.
  *H01M 10/0585* (2010.01)
  *H01M 50/183* (2021.01)
  *H01M 4/02* (2006.01)
  *H01M 50/20* (2021.01)
  *H01M 50/209* (2021.01)

(56) References Cited

FOREIGN PATENT DOCUMENTS

| | | |
|---|---|---|
| JP | 2012-038425 | 2/2012 |
| JP | 2014-082105 | 5/2014 |
| WO | 2016/152565 | 9/2016 |

BATTERY

BACKGROUND

1. Technical Field

The present disclosure relates to a battery.

2. Description of the Related Art

Japanese Unexamined Patent Application Publication No. 2012-038425 discloses an electrode body that includes an electrically insulating material that covers peripheral side surfaces of an active material layer.

International Publication No. 2016/152565 discloses an all-solid-state lithium battery that has a side insulation portion.

Japanese Unexamined Patent Application Publication No. 2008-103292 discloses a solid-state battery that is covered with a resin.

SUMMARY

Reduction in the risk of short-circuiting is desired in the related art.

In one general aspect, the techniques disclosed here feature a battery including an electricity-generating element that includes an electrode layer and a counter-electrode layer, an electrode current collector that is disposed in contact with the electrode layer, a counter-electrode current collector that is disposed in contact with the counter-electrode layer, and a first sealing section that includes a first portion and a second portion. In the battery, the first portion is positioned within an opposing region where the electrode current collector and the counter-electrode current collector oppose each other and is in contact with the electrode current collector and the counter-electrode current collector. In addition, the second portion is positioned outside the opposing region, and the second portion is also positioned outside both an edge of the electrode current collector and an edge of the counter-electrode current collector.

According to the disclosure, the risk of short-circuiting can be reduced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments will be described with reference to the drawings.

Embodiment 1

Figure 1:
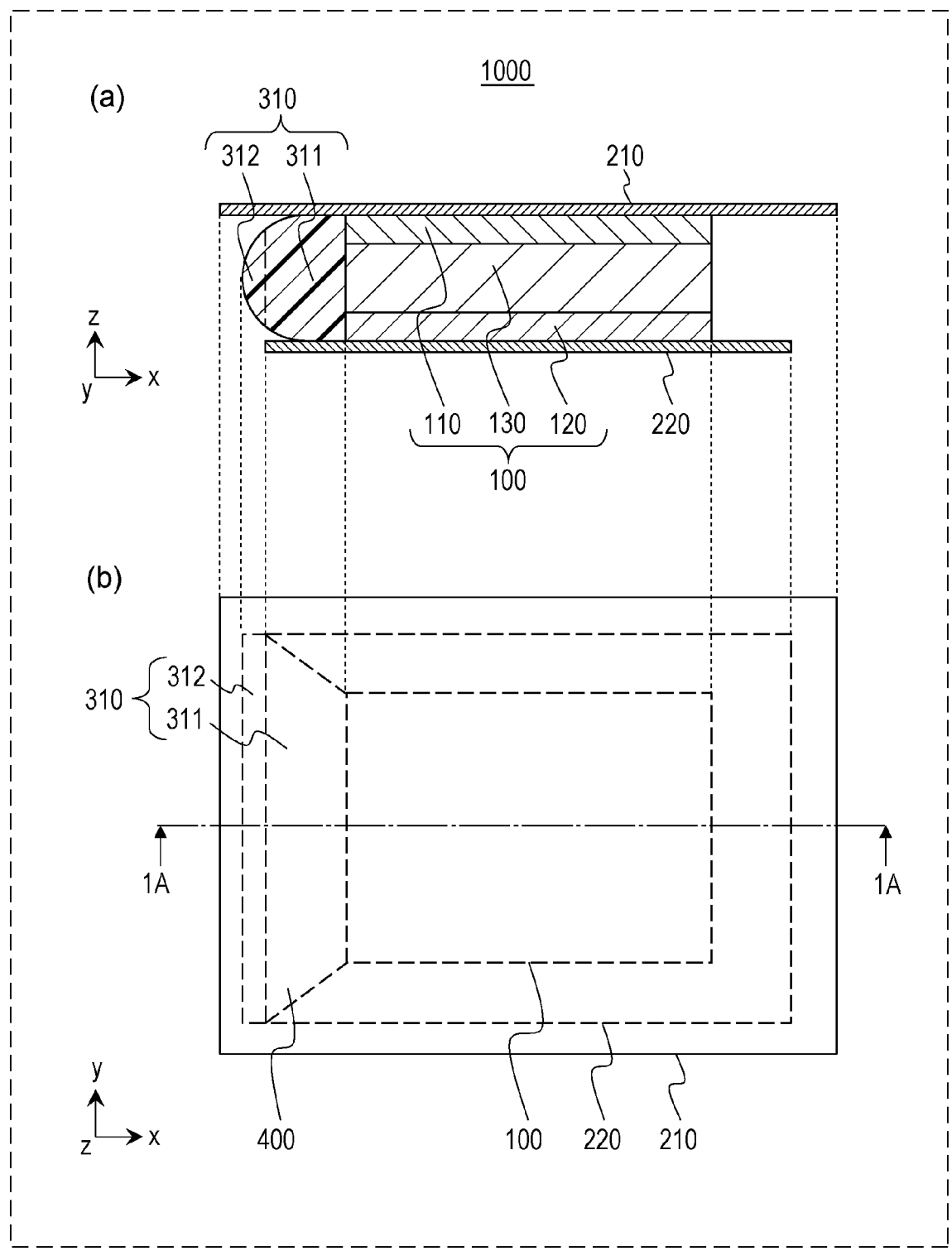
FIG. 1 is a view illustrating a general configuration of a battery according to Embodiment 1.

FIG. 1 is a view illustrating a general configuration of a battery 1000 according to Embodiment 1.

FIG. 1(a) is an xz view (sectional view taken along line 1A-1A) illustrating the general configuration of the battery 1000 according to Embodiment 1.

FIG. 1(b) is an xy view (perspective top view) illustrating the general configuration of the battery 1000 according to Embodiment 1.

The battery 1000 according to Embodiment 1 includes an electricity-generating element 100, an electrode current collector 210, a counter-electrode current collector 220, and a first sealing section 310.

The electricity-generating element 100 includes an electrode layer 110 and a counter-electrode layer 120.

The electrode current collector 210 is disposed in contact with the electrode layer 110.

The counter-electrode current collector 220 is disposed in contact with the counter-electrode layer 120.

The first sealing section 310 has a first portion 311 and a second portion 312.

The first portion 311 is positioned within an opposing region 400, which is a region where the electrode current collector 210 and the counter-electrode current collector 220 oppose each other.

The second portion 312 is positioned outside the opposing region 400.

With the configuration described above, the likelihood of the electrode current collector 210 and the counter-electrode current collector 220 coming into contact with each other can be reduced. In other words, the first portion 311 of the first sealing section 310 can maintain the distance between the electrode current collector 210 and the counter-electrode current collector 220 to a predetermined amount or more (for example, the thickness of the first portion 311 or more). As a result, the electrode current collector 210 and the counter-electrode current collector 220 can avoid coming closer to each other. Moreover, even if one of the current collectors develops a deformity (for example, a bend or burr), the second portion 312 of the first sealing section 310 can restrain the deformed portion from coming into contact with the other current collector. Thus, in a case of, for example, an all-solid-state battery (or a battery that does not have a separator 600 between the electrode layer 110 and the counter-electrode layer 120), the first portion 311 and the second portion 312 can also reduce the risk of the electrode current collector 210 and the counter-electrode current collector 220 coming into direct contact with each other and consequent short-circuiting between the electrode layer 110 and the counter-electrode layer 120.

Note that the first sealing section 310 may be a member that contains a first material. In other words, the first portion 311 and the second portion 312 may contain the first material. The first sealing section 310 may be, for example, a member that contains the first material as a main constituent. In other words, the first portion 311 and the second portion 312 may contain the first material as a main constituent. The first sealing section 310 may be, for example, a member that is formed of the first material alone. In other words, the first portion 311 and the second portion 312 may contain the first material only.

A generally known material (for example, a sealant) that is used for sealing members of batteries can be used as the first material. For example, a resin material can be used as the first material.

The first material may be a material that has an electrical insulation property and does not have ionic conductivity.

With the configuration described above, the first material, which has the electrical insulation property, can prevent electrical connectivity between the electrode current collector 210 and the counter-electrode current collector 220. In addition, the first material, which does not have ionic conductivity, can prevent deterioration in battery properties, which is caused by contact between the second portion 312 of the first sealing section 310 and other battery members (for example, the second portion 312 of the first sealing section 310 of another battery).

The first material may be at least one of epoxy resin, acrylic resin, polyimide resin, and silsesquioxane.

With the configuration described above, the first sealing section 310 can be formed as a member that has an electrical insulation property but no ionic conductivity and that hardens easily. In other words, the first material can have fluidity in the initial state and can be hardened afterwards (fluidity is lost by exposure to, for example, ultraviolet radiation, heat treatment, etc.). This enables the second portion 312 of the first sealing section 310 to be protruded from the opposing region 400 by using a method such as temporal hardening by heat treatment or ultraviolet radiation (with complete hardening by subsequent heat treatment).

The first sealing section 310 may contain a metal oxide material in granular form.

With the configuration described above, the properties of the first sealing section 310, such as ability to retain the shape of the battery, electrical insulation, heat conductivity, and moisture-proof property, can be further improved.

A material to be used as the metal oxide material can be, for example, silicon oxide, aluminum oxide, titanium oxide, zinc oxide, cerium oxide, iron oxide, tungsten oxide, zirconium oxide, calcium oxide, zeolite, or glass.

It is sufficient if the grain size of the metal oxide material is smaller than or equal to the gap between the electrode current collector 210 and the counter-electrode current collector 220. The grain shape of the metal oxide material may be circular, oval, rod-like, or any other shape.

The opposing region 400 is a region where the electrode current collector 210 and the counter-electrode current collector 220 oppose each other. In other words, the opposing region 400 is a region where the electrode current collector 210 and the counter-electrode current collector 220 overlap each other when viewed in the stacking direction of the current collectors (in the z direction). For example, if the counter-electrode current collector 220 is smaller than the electrode current collector 210 and the counter-electrode current collector 220 is located within an area where the electrode current collector 210 is formed, the opposing region 400 extends over the forming area where the counter-electrode current collector 220 is formed. For example, if the electrode current collector 210 and the counter-electrode current collector 220 have an identical size (i.e., the same shape), the opposing region 400 extends over the forming area of the electrode current collector 210.

The electricity-generating element 100 is, for example, an electricity-generating device that has the ability to recharge and discharge electricity (for example, a rechargeable battery). For example, the electricity-generating element 100 may be a single battery cell.

The electrode layer 110 is a layer that contains an electrode material (for example, an active material).

The counter-electrode layer 120 is a layer that contains a counter-electrode material (for example, an active material). The counter-electrode material is a material that exhibits a polarity opposite to the electrode material polarity.

The electrode current collector 210 and the counter-electrode current collector 220 are members having electroconductivity. The electrode current collector 210 and the counter-electrode current collector 220 may be, for example, thin films having electroconductivity. A material used to form the electrode current collector 210 and the counter-electrode current collector 220 can be, for example, a metal (such as stainless steel, aluminum, or copper). Moreover, the electrode current collector 210 may include a current collector layer (for example, a layer containing an electroconductive material) that is disposed in contact with the electrode layer 110. The counter-electrode current collector 220 may include a current collector layer (for example, a layer containing an electroconductive material) that is disposed in contact with the counter-electrode layer 120.

Note that the electrode current collector 210 may be formed to cover an area larger than the electrode layer 110. The counter-electrode current collector 220 may be formed to cover an area larger than the counter-electrode layer 120.

Note that the electrode layer 110 may be an anode active material layer. In this case, the electrode material is an anode active material, the electrode current collector 210 is an anode current collector, the counter-electrode layer 120 is a cathode active material layer, the counter-electrode material is a cathode active material, and the counter-electrode current collector 220 is a cathode current collector.

Alternatively, the electrode layer 110 may be a cathode active material layer. In this case, the electrode material is a cathode active material, the electrode current collector 210 is a cathode current collector, the counter-electrode layer 120 is an anode active material layer, the counter-electrode material is an anode active material, and the counter-electrode current collector 220 is an anode current collector.

A known cathode active material (for example, lithium cobalt oxide or $LiNO_x$) can be used as the cathode active material contained in the cathode active material layer. Various materials that can release and intercalate ions, such as lithium ions or magnesium ions, can be used for the cathode active material.

In addition, a known solid electrolyte (for example, an inorganic solid electrolyte) can be used as a constituent contained in the cathode active material layer. An example of the inorganic solid electrolyte is a sulfide solid electrolyte or an oxide solid electrolyte. An example of the sulfide solid electrolyte is a mixture of $Li_2S$ and $P_2S_5$. The surface of the cathode active material may be coated with the solid electrolyte. The cathode active material layer may also contain constituents such as an electroconductive material (for example, acetylene black) and an adhesive binder (for example, polyvinylidene difluoride).

The cathode active material layer can be formed by preparing a paste-like paint in which the constituents of the cathode active material layer are mixed with a solvent, applying the paste-like paint onto the surface of the cathode current collector, and drying the paste-like paint. The cathode active material layer may be pressed, after drying, to increase the density of the layer. The cathode active material layer produced in such a manner has a thickness of, for example, 5 to 300 μm.

Metal foil (for example, stainless-steel foil or aluminum foil) can be used as the cathode current collector. The cathode current collector has a thickness of, for example, 5 to 100 μm.

A known anode active material (for example, graphite or lithium metal) can be used as the anode active material contained in the anode active material layer. Various materials that can release and intercalate ions, such as lithium ions or magnesium ions, can be used for the anode active material.

In addition, a known solid electrolyte (for example, an inorganic solid electrolyte) can be used as a constituent contained in the anode active material layer. An example of the inorganic solid electrolyte is a sulfide solid electrolyte or an oxide solid electrolyte. An example of the sulfide solid electrolyte is a mixture of $Li_2S$ and $P_2S_5$. The anode active material layer may also contain constituents such as an electroconductive material (for example, acetylene black) and an adhesive binder (for example, polyvinylidene difluoride).

The anode active material layer can be formed by preparing a paste-like paint in which the constituents of the anode active material layer are mixed with a solvent, applying the paste-like paint onto the surface of the anode current collector, and drying the paste-like paint. An anode plate may be pressed to increase the density of the anode active material layer. The anode active material layer produced in such a manner has a thickness of, for example, 5 to 300 μm.

Metal foil (for example, stainless-steel foil or copper foil) can be used as the anode current collector. The anode current collector has a thickness of, for example, 5 to 100 μm.

Note that the electricity-generating element 100 may include an electrolyte layer 130. The electrolyte layer 130 is disposed between the electrode layer 110 and the counter-electrode layer 120. The electrolyte layer 130 is a layer that contains an electrolyte material. A generally known electrolyte material that is used for batteries can be used as the electrolyte material. The thickness of the electrolyte layer 130 may be 5 to 300 μm or may be 5 to 100 μm.

Note that the electrolyte material may be, for example, a solid electrolyte. In other words, the electricity-generating element 100 may include a solid electrolyte layer. The electricity-generating element 100 may be, for example, an all-solid-state battery.

A known solid electrolyte (for example, an inorganic solid electrolyte) can be used as the solid electrolyte. An example of the inorganic solid electrolyte is a sulfide solid electrolyte or an oxide solid electrolyte. An example of the sulfide solid electrolyte is a mixture of $Li_2S$ and $P_2S_5$. Note that the electrolyte layer 130 may also contain a constituent such as an adhesive binder (for example, polyvinylidene difluoride) in addition to the electrolyte material.

Note that, as illustrated in FIG. 1, the second portion 312 may be positioned outside an edge of the counter-electrode current collector 220 (i.e., outside the periphery of the counter-electrode current collector 220). In this case, the second portion 312 may be positioned inside an edge of the electrode current collector 210 (i.e., within a region of the electrode current collector 210 toward the center).

Figure 2:
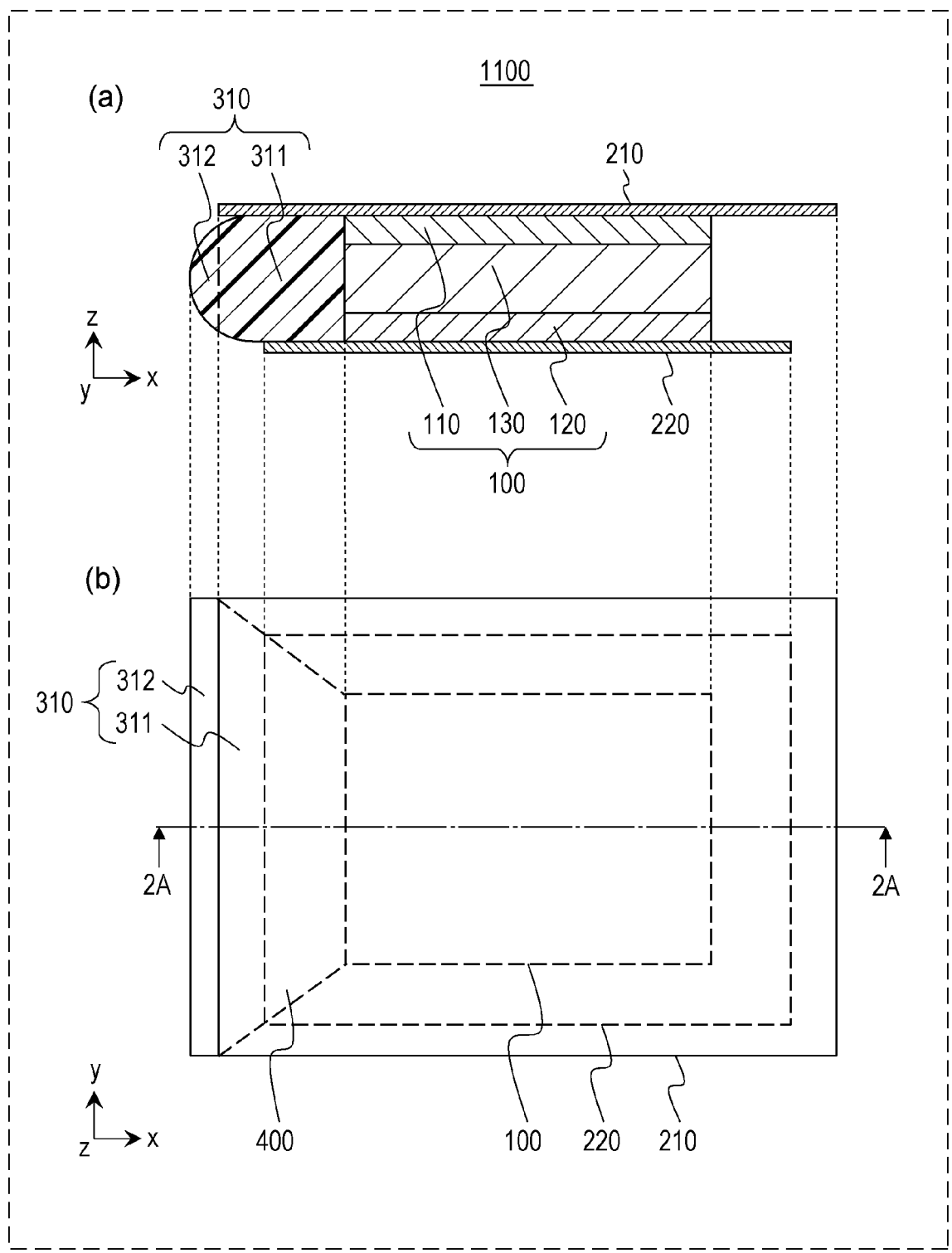
FIG. 2 is a view illustrating a general configuration of a battery according to Embodiment 1.

FIG. 2 is a view illustrating a general configuration of a battery 1100 according to Embodiment 1.

FIG. 2(*a*) is an xz view (sectional view taken along line 2A-2A) illustrating the general configuration of the battery 1100 according to Embodiment 1.

FIG. 2(*b*) is an xy view (perspective top view) illustrating the general configuration of the battery 1100 according to Embodiment 1.

As illustrated in FIG. 2, the second portion 312 may be positioned outside both the edge of the electrode current collector 210 and the edge of the counter-electrode current collector 220 (i.e., outside the peripheries of the current collectors).

With the configuration described above, the creepage distance between the edge of the electrode current collector 210 and the corresponding edge of the counter-electrode current collector 220 along the second portion 312 can be increased. Thus, the second portion 312 of the first sealing section 310 can further restrain the current collectors from coming into contact with each other due to deformation of a current collector. As a result, the risk of the electrode layer 110 and the counter-electrode layer 120 being short-circuited can be further reduced.

Note that as illustrated in FIGS. 1 and 2, the first portion 311 may be positioned in contact with a portion of the edges of the electricity-generating element 100 (for example, one side of the electricity-generating element 100 if the electricity-generating element 100 has a rectangular shape). In this case, the second portion 312 may be disposed in contact with the first portion 311.

Alternatively, the first portion 311 may be positioned in contact with all edges of the electricity-generating element 100 (for example, all sides of the electricity-generating element 100 when the electricity-generating element 100 has a rectangular shape). In this case, the second portion 312 may be disposed in contact with all edges of the first portion 311.

Figure 3:
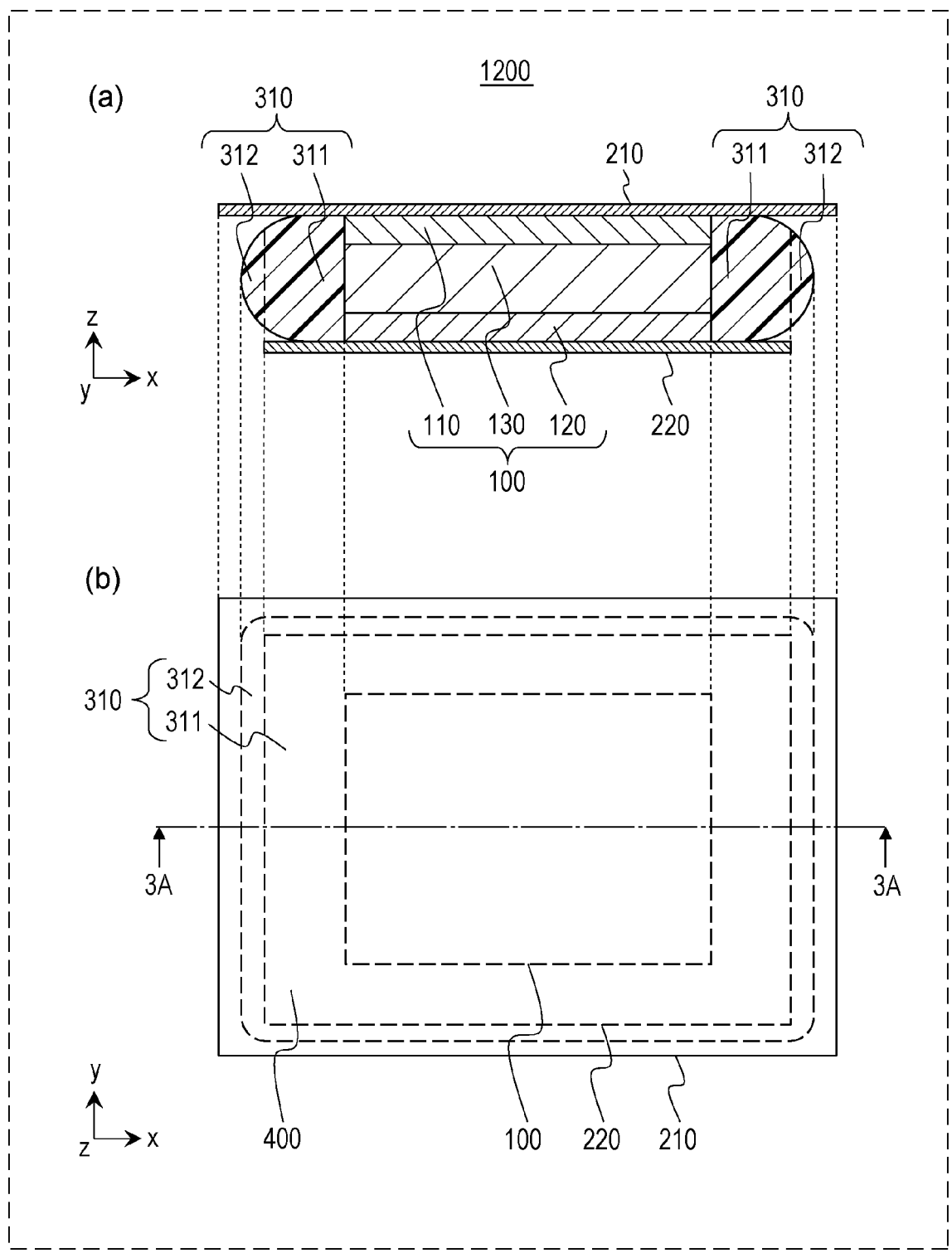
FIG. 3 is a view illustrating a general configuration of a battery according to Embodiment 1.

FIG. 3 is a view illustrating a general configuration of a battery 1200 according to Embodiment 1.

FIG. 3(*a*) is an xz view (sectional view taken along line 3A-3A) illustrating the general configuration of the battery 1200 according to Embodiment 1.

FIG. 3(*b*) is an xy view (perspective top view) illustrating the general configuration of the battery 1200 according to Embodiment 1.

As illustrated in FIG. 3, the first portion 311 may be positioned to surround the electricity-generating element 100.

In this case, as illustrated in FIG. 3, the second portion 312 may be positioned to surround the first portion 311.

With the configuration described above, the first portion 311 of the first sealing section 310 can maintain the distance between the electrode current collector 210 and the counter-electrode current collector 220 to a predetermined amount or more (for example, the thickness of the first portion 311 or more) around the electricity-generating element 100 (for example, at four sides thereof). As a result, the electrode current collector 210 and the counter-electrode current collector 220 can avoid coming closer to each other around the electricity-generating element 100. Moreover, even if one of the current collectors develops a deformity (for example, a bend or burr) around the electricity-generating element 100, the second portion 312 of the first sealing section 310 can restrain the deformed portion from coming into contact with the other current collector. This further reduces the risk of the electrode layer 110 and the counter-electrode layer 120 being short-circuited.

With the configuration described above, the first portion 311 can cover side surfaces of members of the electricity-generating element 100. For example, the electricity-generating element 100 includes, as the members constituting the electricity-generating element 100, the electrode material contained in the electrode layer 110, the counter-electrode material contained in the counter-electrode layer 120, and the solid electrolyte material contained in the electrolyte layer 130. Thus, even if a portion of such a member falls off, the first portion 311 can restrain the fallen-off portion from coming into contact with other members within the battery. Accordingly, short-circuiting within the battery caused by fallen-off portions of a member that constitutes the battery can be suppressed. As a result, the reliability of the battery can be further improved.

Figure 4:
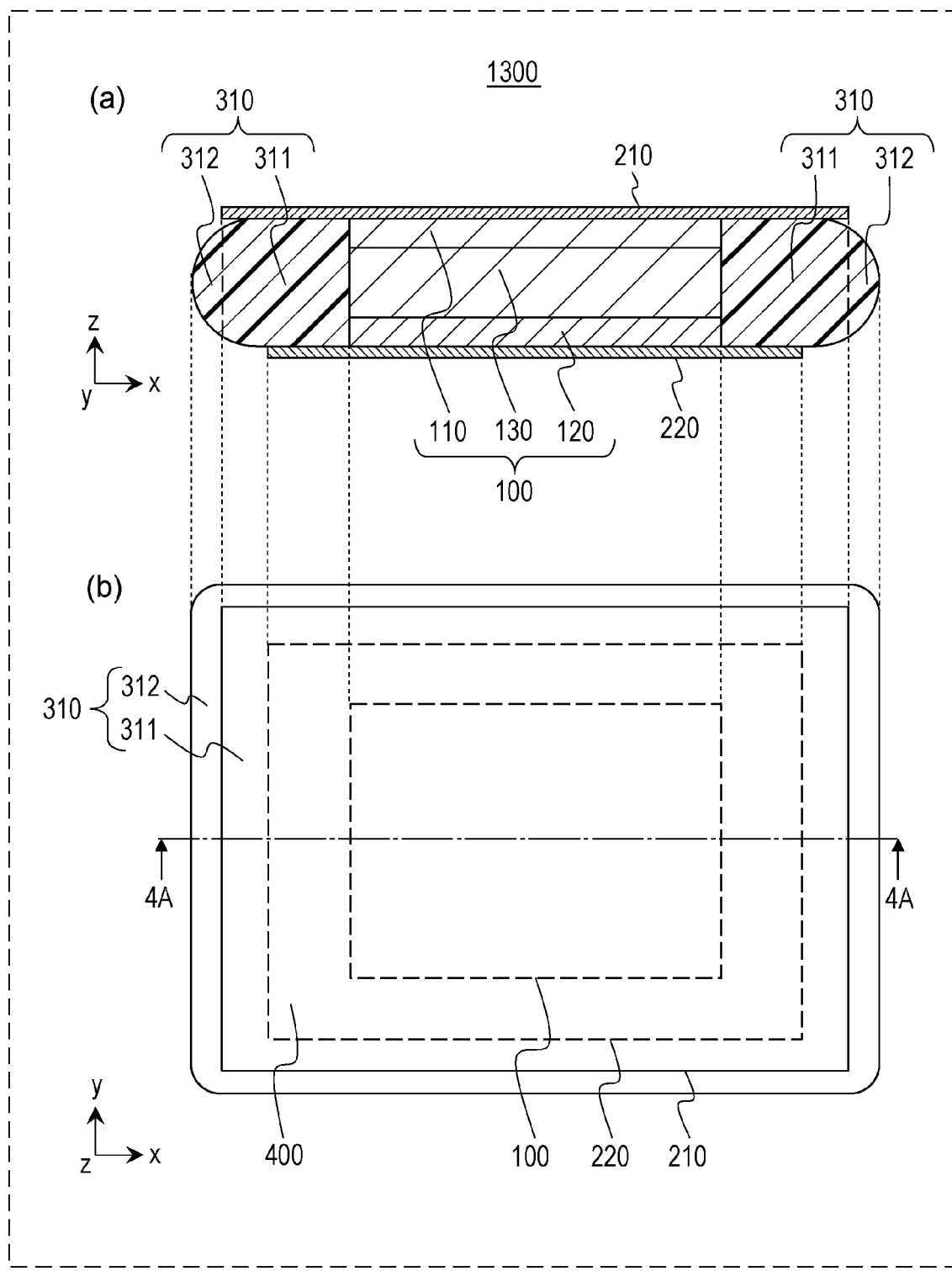
FIG. 4 is a view illustrating a general configuration of a battery according to Embodiment 1.

FIG. 4 is a view illustrating a general configuration of a battery 1300 according to Embodiment 1.

FIG. 4(a) is an xz view (sectional view taken along line 4A-4A) illustrating the general configuration of the battery 1300 according to Embodiment 1.

FIG. 4(b) is an xy view (perspective top view) illustrating the general configuration of the battery 1300 according to Embodiment 1.

As illustrated in FIG. 4, the first portion 311 may be positioned to surround the electricity-generating element 100.

In this case, as illustrated in FIG. 4, the second portion 312 may be positioned outside each of the edges of the electrode current collector 210 and outside each of the edges of the counter-electrode current collector 220 (i.e., outside the peripheries of both current collectors) while the second portion 312 surrounds the first portion 311.

With the configuration described above, the creepage distance between the edges of the electrode current collector 210 and the corresponding edges of the counter-electrode current collector 220 along the second portion 312 can be increased around the electricity-generating element 100 (for example, at four sides thereof). Thus, the second portion 312 of the first sealing section 310 can further restrain the current collectors from coming into contact with each other due to deformation of a current collector. As a result, the risk of the electrode layer 110 and the counter-electrode layer 120 being short-circuited can be further reduced.

Note that as illustrated in FIGS. 1 to 4, the second portion 312 may be positioned without covering the edges of the electrode current collector 210 and the edges of the counter-electrode current collector 220.

With the configuration described above, deformation of a current collector due to the second portion 312 of the first sealing section 310 adhering to an edge of the current collector can be suppressed. Thus, contact between the current collectors caused by the deformation of a current collector can be further suppressed. As a result, the risk of the electrode layer 110 and the counter-electrode layer 120 being short-circuited can be further reduced.

Note that as illustrated in FIGS. 1 to 4, the first portion 311 may be in contact with the electrode current collector 210 and with the counter-electrode current collector 220.

With the configuration described above, the first portion 311 is a member that is formed continuously (i.e., integrally) between the electrode current collector 210 and the counter-electrode current collector 220. Accordingly, the first portion 311 of the first sealing section 310 can reliably maintain the distance between the electrode current collector 210 and the counter-electrode current collector 220 to a predetermined amount or more (for example, the thickness of the first portion 311 or more). Thus, it is possible to avoid reliably the electrode current collector 210 and the counter-electrode current collector 220 coming closer to each other. As a result, the risk that the electrode current collector 210 and the counter-electrode current collector 220 come into direct contact with each other and the electrode layer 110 and the counter-electrode layer 120 are thereby short-circuited can be further reduced.

Figure 5:
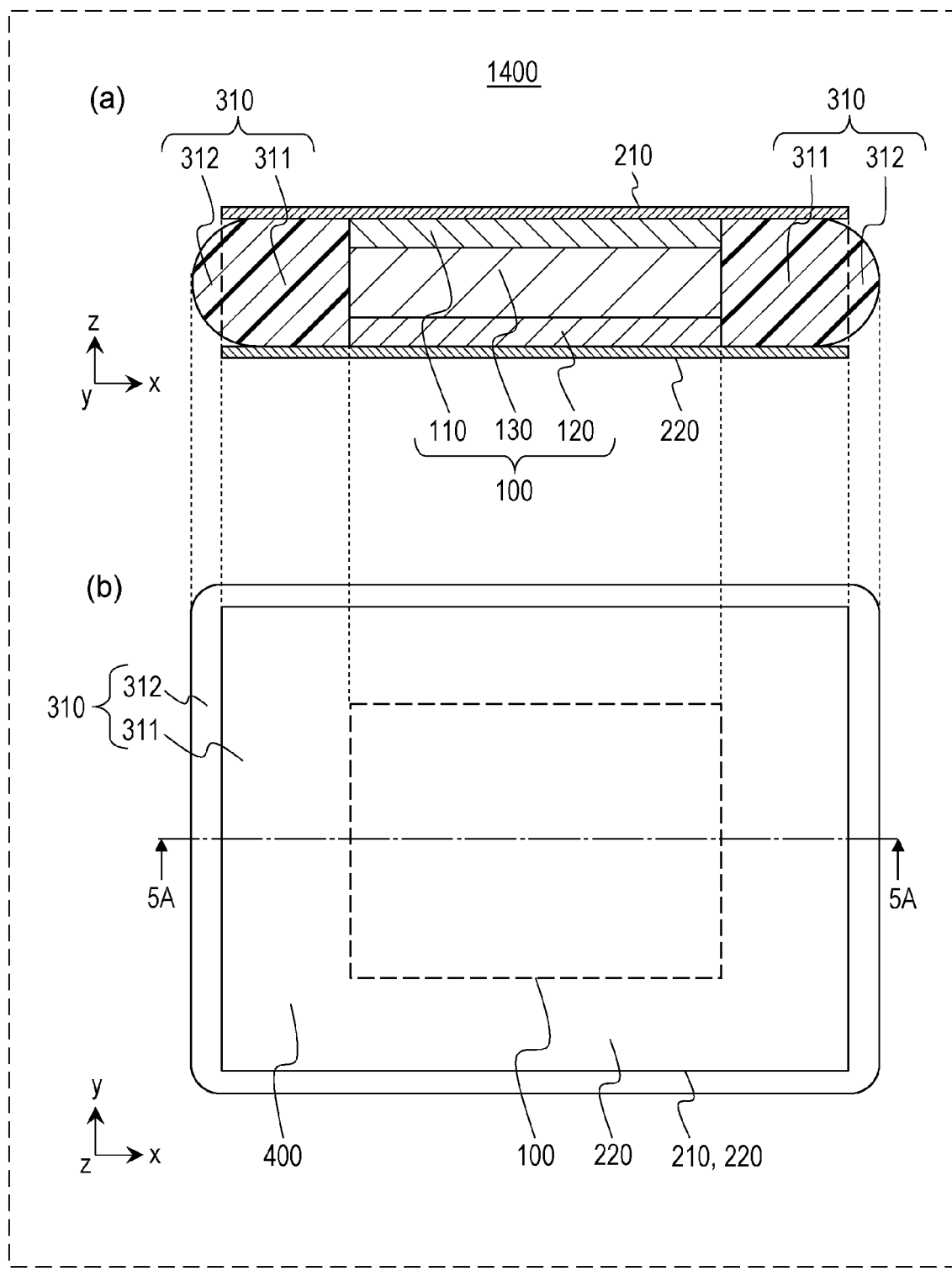
FIG. 5 is a view illustrating a general configuration of a battery according to Embodiment 1.

FIG. 5 is a view illustrating a general configuration of a battery 1400 according to Embodiment 1.

FIG. 5(a) is an xz view (sectional view taken along line 5A-5A) illustrating the general configuration of the battery 1400 according to Embodiment 1.

FIG. 5(b) is an xy view (perspective top view) illustrating the general configuration of the battery 1400 according to Embodiment 1.

As illustrated in FIG. 5, the electrode current collector 210 and the counter-electrode current collector 220 may have an identical shape.

Note that as illustrated in FIGS. 1 to 5, the first portion 311 may be in contact with the electricity-generating element 100. In other words, the first portion 311 may be in contact with at least one of the electrode layer 110, the counter-electrode layer 120, and the electrolyte layer 130.

With the configuration described above, the first portion 311 can protect side surfaces of the members of the electricity-generating element 100 of the battery. In other words, the first portion 311 can suppress falling-off of a portion of the members constituting the electricity-generating element 100 (for example, the electrode material contained in the electrode layer 110, the counter-electrode material contained in the counter-electrode layer 120, and the solid electrolyte material contained in the electrolyte layer 130).

Note that as illustrated in FIGS. 1 to 5, the forming area where the electrode layer 110 is formed may have a size equal to a size of the forming area where the counter-electrode layer 120 is formed.

In addition, as illustrated in FIGS. 1 to 5, the electrolyte layer 130 may be formed to have an area equal to respective forming areas of the electrode layer 110 and the counter-electrode layer 120. In other words, the electrolyte layer 130 may be positioned without covering neither of the edges (i.e., sides) of the electrode layer 110 and the edges (i.e., sides) of the counter-electrode layer 120.

In this case, as illustrated in FIGS. 1 to 5, the first portion 311 may be in contact with respective edges (i.e., sides) of the electrode layer 110, the counter-electrode layer 120, and the electrolyte layer 130.

Figure 6:
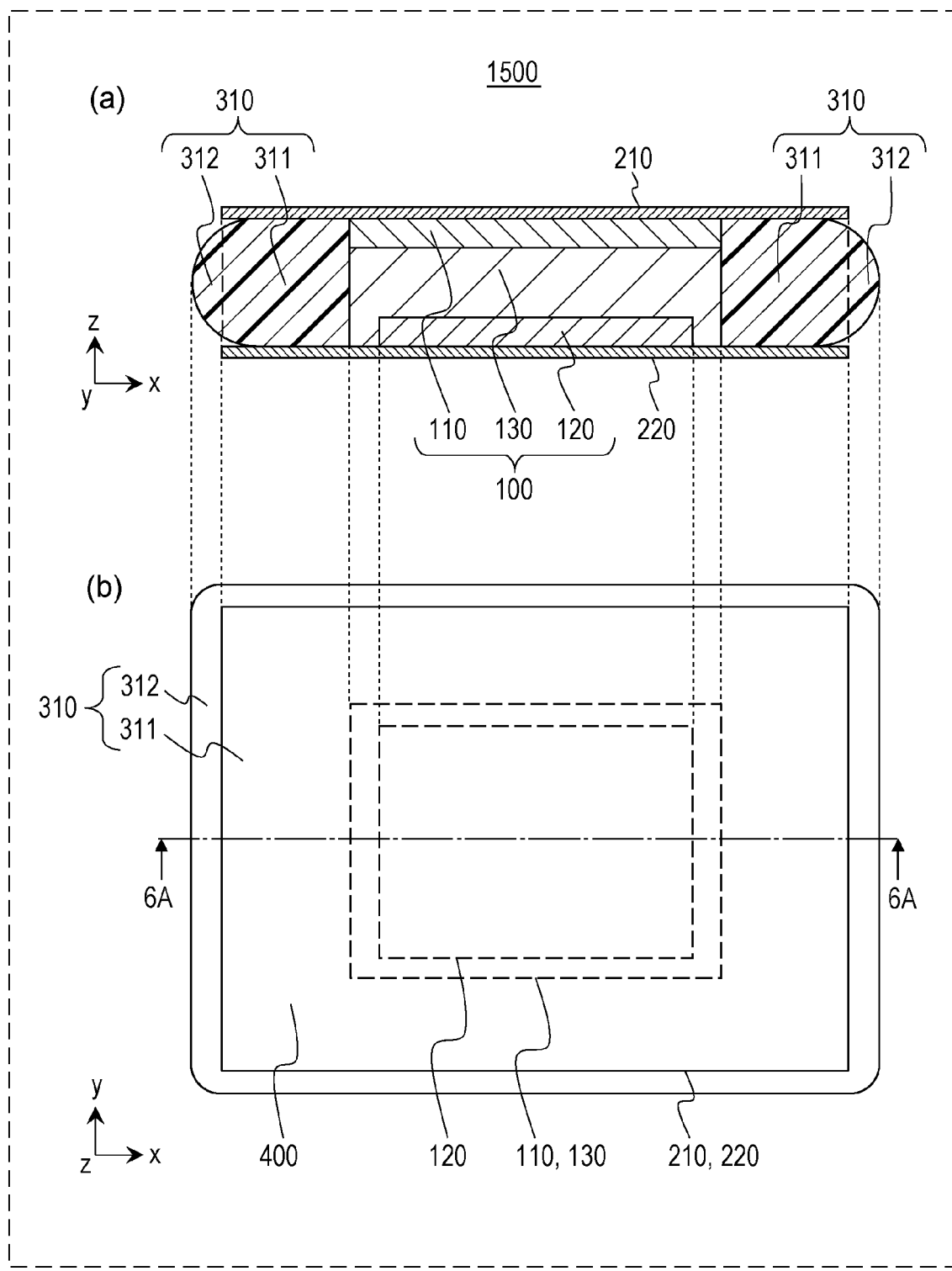
FIG. 6 is a view illustrating a general configuration of a battery according to Embodiment 1.

FIG. 6 is a view illustrating a general configuration of a battery 1500 according to Embodiment 1.

FIG. 6(a) is an xz view (sectional view taken along line 6A-6A) illustrating the general configuration of the battery 1500 according to Embodiment 1.

FIG. 6(b) is an xy view (perspective top view) illustrating the general configuration of the battery 1500 according to Embodiment 1.

As illustrated in FIG. 6, the forming area of the electrode layer 110 may be different in size from the forming area of the counter-electrode layer 120. For example, the forming area of the electrode layer 110 may be larger than the forming area of the counter-electrode layer 120.

With the configuration described above, for example, the forming area of the anode active material layer can be made larger than the forming area of the cathode active material layer. As a result, deterioration of battery reliability due to lithium deposition (or magnesium deposition) can be prevented.

Note that as illustrated in FIG. 6, the electrolyte layer 130 may cover the edges (i.e., sides) of the electrode layer 110 or the counter-electrode layer 120 of which the forming area is smaller. For example, the electrolyte layer 130 may cover the edges (i.e., sides) of the counter-electrode layer 120.

In this case, as illustrated in FIG. 6, the first portion 311 may be in contact with the edges (i.e., sides) of the electrode layer 110 and the electrolyte layer 130.

Figure 7:
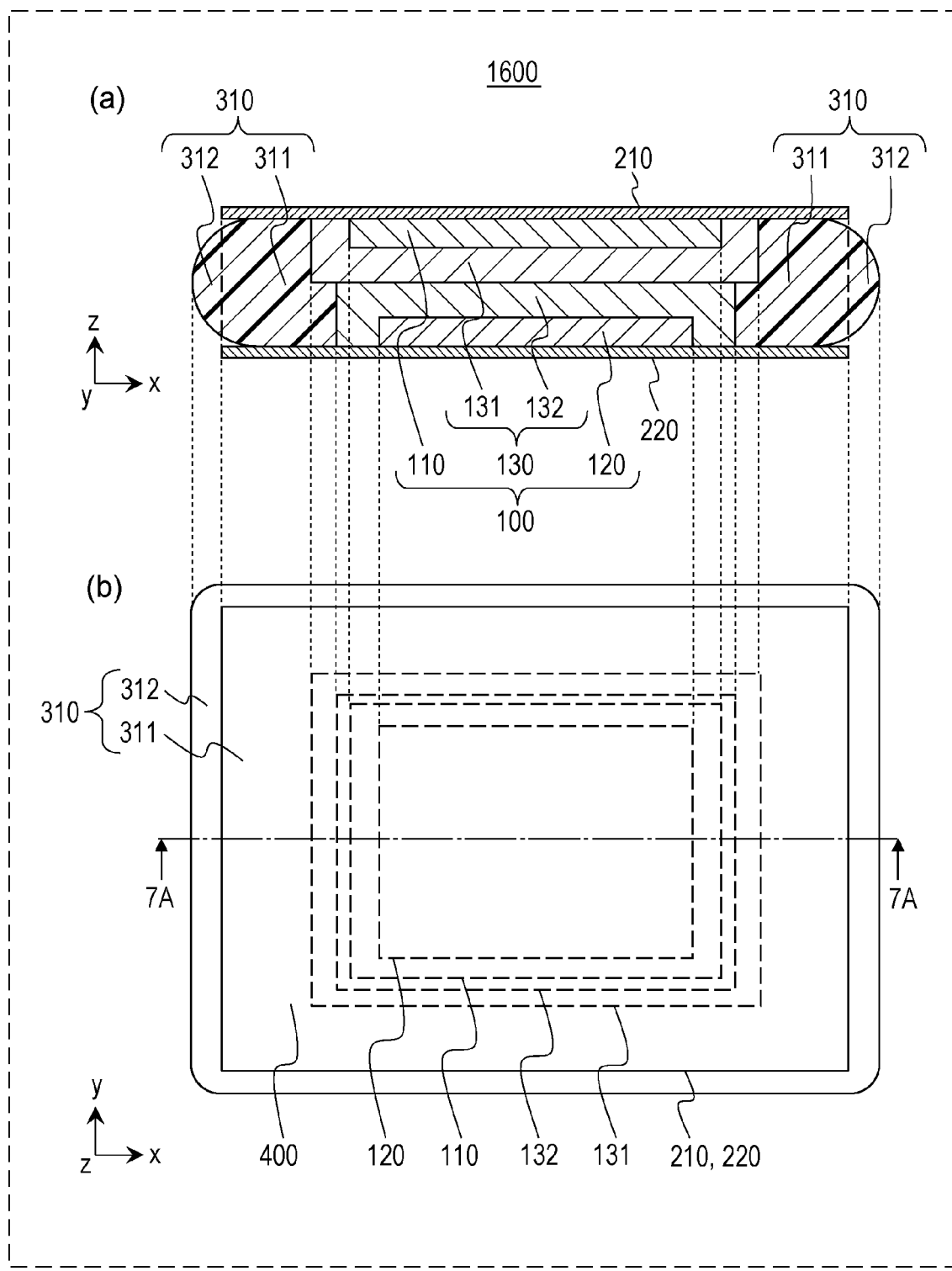
FIG. 7 is a view illustrating a general configuration of a battery according to Embodiment 1.

FIG. 7 is a view illustrating a general configuration of a battery 1600 according to Embodiment 1.

FIG. 7(a) is an xz view (sectional view taken along line 7A-7A) illustrating the general configuration of the battery 1600 according to Embodiment 1.

FIG. 7(b) is an xy view (perspective top view) illustrating the general configuration of the battery 1600 according to Embodiment 1.

As illustrated in FIG. 7, the electrolyte layer 130 may include an electrode-side electrolyte layer 131 and a counter-electrode-side electrolyte layer 132.

The electrode-side electrolyte layer 131 is disposed closer to the electrode layer 110. For example, the electrode-side electrolyte layer 131 may cover the edges of the electrode layer 110.

The counter-electrode-side electrolyte layer 132 is disposed closer to the counter-electrode layer 120. For example, the counter-electrode-side electrolyte layer 132 may cover the edges of the counter-electrode layer 120.

In this case, as illustrated in FIG. 7, the first portion 311 may be in contact with the edges (i.e., sides) of the electrode-side electrolyte layer 131 and the counter-electrode-side electrolyte layer 132.

Figure 8:
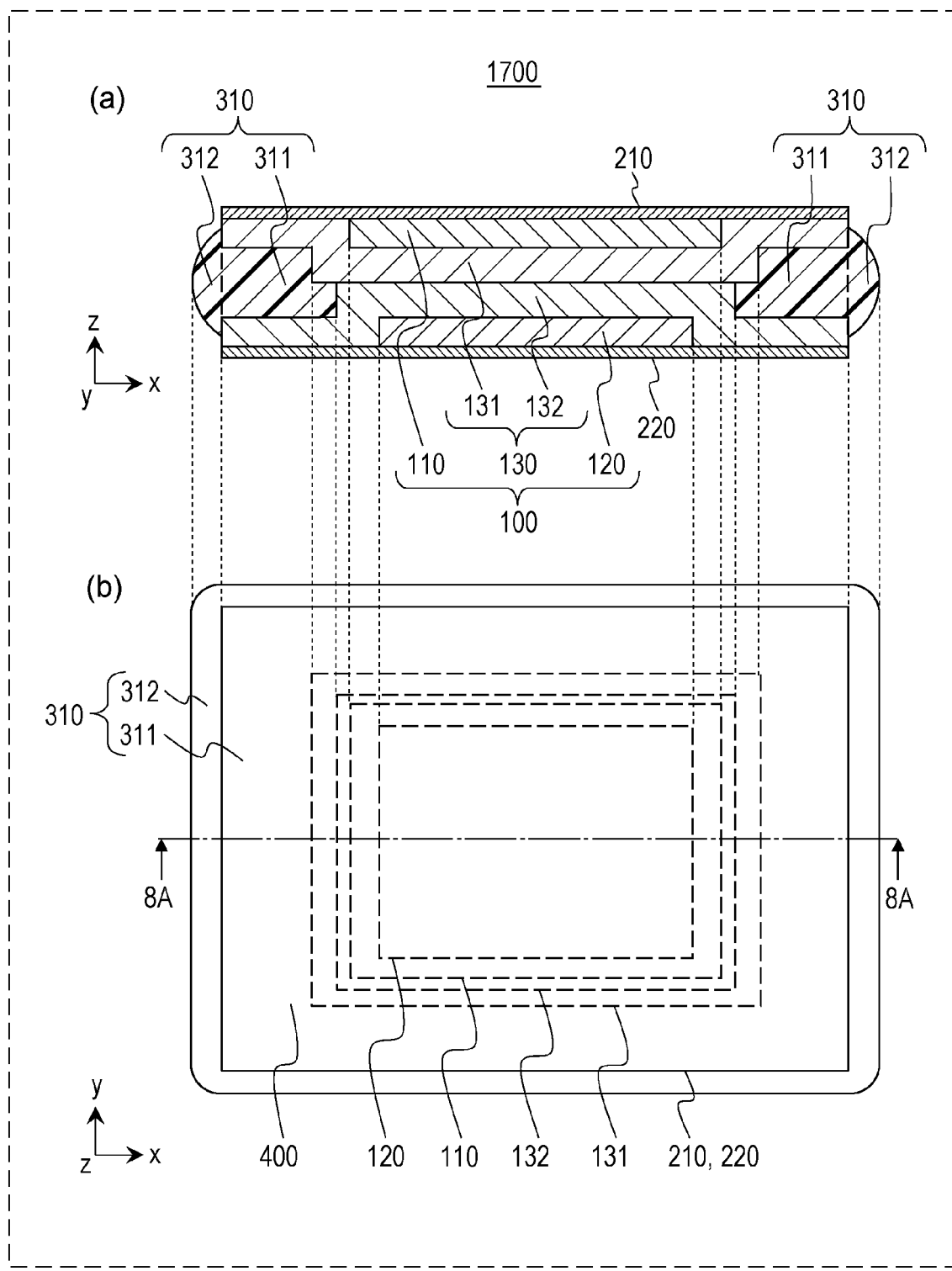
FIG. 8 is a view illustrating a general configuration of a battery according to Embodiment 1.

FIG. 8 is a view illustrating a general configuration of a battery 1700 according to Embodiment 1.

FIG. 8(a) is an xz view (sectional view taken along line 8A-8A) illustrating the general configuration of the battery 1700 according to Embodiment 1.

FIG. 8(b) is an xy view (perspective top view) illustrating the general configuration of the battery 1700 according to Embodiment 1.

As illustrated in FIG. 8, the electrode-side electrolyte layer 131 may be formed to extend over the same area where the electrode current collector 210 extends.

As illustrated in FIG. 8, the counter-electrode-side electrolyte layer 132 may be formed to extend over the same area where the counter-electrode current collector 220 extends.

In this case, as illustrated in FIG. 8, the first portion 311 may be positioned in contact with the electrode-side electrolyte layer 131 and with the counter-electrode-side electrolyte layer 132.

In addition, the edges (i.e., sides) of the electrode-side electrolyte layer 131 and the counter-electrode-side electrolyte layer 132 may be exposed without being covered by the first portion 311.

Note that the electrode-side electrolyte layer 131 and the counter-electrode-side electrolyte layer 132 are layers that contain the electrolyte material. A generally known electrolyte material used for batteries can be used as the electrolyte material. The electrolyte material may be, for example, a solid electrolyte. The electrode-side electrolyte layer 131 and the counter-electrode-side electrolyte layer 132 may contain the same electrolyte material or may contain different electrolyte materials. The thicknesses of the electrode-side electrolyte layer 131 and the counter-electrode-side electrolyte layer 132 may be 5 to 150 µm or alternatively 5 to 50 µm.

Embodiment 2

Embodiment 2 will be described below. Note that descriptions that duplicate those provided in Embodiment 1 will be omitted as appropriate.

Figure 9:
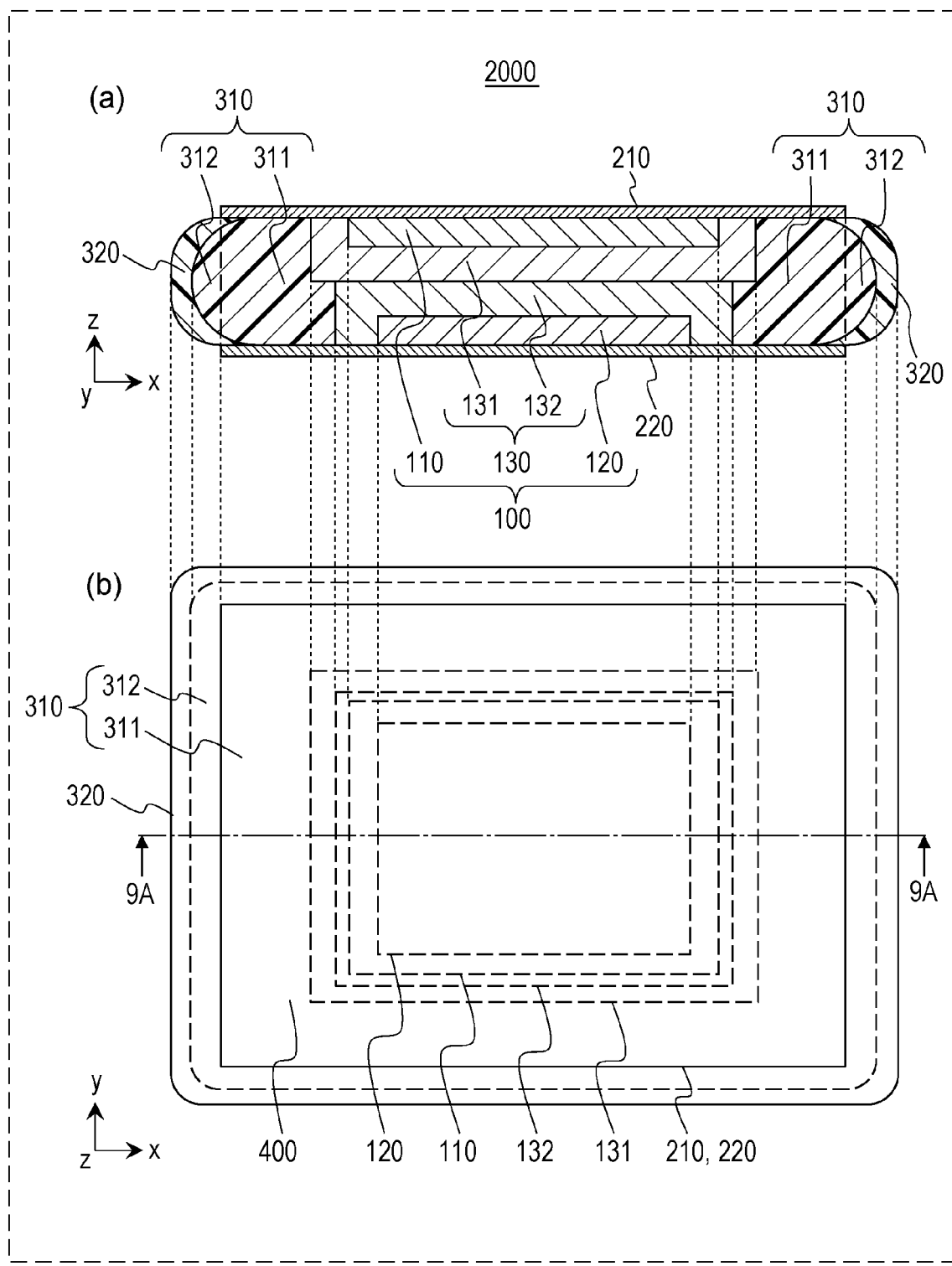
FIG. 9 is a view illustrating a general configuration of a battery according to Embodiment 2.

FIG. 9 is a view illustrating a general configuration of a battery 2000 according to Embodiment 2.

FIG. 9(a) is an xz view (sectional view taken along line 9A-9A) illustrating the general configuration of the battery 2000 according to Embodiment 2.

FIG. 9(b) is an xy view (perspective top view) illustrating the general configuration of the battery 2000 according to Embodiment 2.

The battery 2000 according to Embodiment 2 includes the following configurations in addition to the configurations of the battery according to Embodiment 1 described above.

In other words, the battery 2000 according to Embodiment 2 further includes a second sealing section 320.

The second sealing section 320 is positioned in contact with the first sealing section 310.

The first sealing section 310 is positioned between the electricity-generating element 100 and the second sealing section 320.

The first sealing section 310 contains the first material.

The second sealing section 320 contains a second material. The second material is different from the first material.

With the configuration described above, a material suitable for suppressing contact between the electrode current collector 210 and the counter-electrode current collector 220 can be selected as the first material for the first sealing section 310. For example, an environmentally tolerant material (a material having, for example, water resistance or moisture resistance) may be used as the second material for the second sealing section 320 that is positioned outside the first sealing section 310, while a material that has a higher strength but has a low environmental tolerance can be used as the first material for the first sealing section 310. As a result, the risk that the electrode current collector 210 and the counter-electrode current collector 220 come into direct contact with each other and the electrode layer 110 and the counter-electrode layer 120 are thereby short-circuited can be reduced while improving the environmental tolerance of the battery.

A generally known material (for example, a sealant) used for sealing members of batteries can be used as the second material. For example, a resin material can be used as the second material.

Note that as illustrated in FIG. 9, the first portion 311 may be positioned to surround the electricity-generating element 100.

In this case, as illustrated in FIG. 9, the second portion 312 may be positioned to surround the first portion 311.

Also in this case, as illustrated in FIG. 9, the second sealing section 320 may be positioned to surround the second portion 312.

Figure 10:
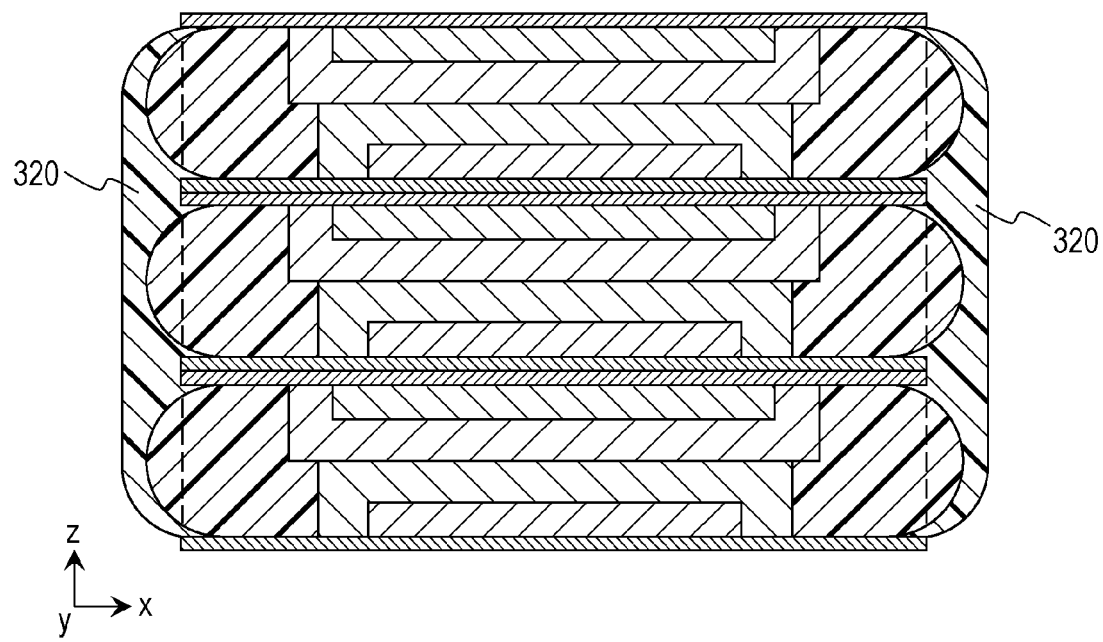
FIG. 10 is an xz view (sectional view) illustrating a general configuration of a battery according to Embodiment 2.

FIG. 10 is an xz view (sectional view) illustrating a general configuration of a battery 2100 according to Embodiment 2.

The battery 2100 according to Embodiment 2 is formed by stacking and connecting a plurality of the batteries according to Embodiment 1 in series.

With the configuration described above, batteries stacked and connected in series can provide high voltage. Thus, a stacked battery that is of serial connection type and has a low risk of short-circuiting can be realized. In other words, a bipolar structure in which batteries are stacked and connected in series and the risk of the current collectors being short-circuited is low can be realized.

In the battery 2100 according to Embodiment 2, certain batteries (e.g., battery cells), which are the batteries according to Embodiment 1, can be stacked by joining the electrode current collector 210 of one of the batteries (e.g., battery cells) to the counter-electrode current collector 220 of another one of the batteries (e.g., battery cells). These current collectors may be joined together directly. Alternatively, these current collectors may be joined together by using an electroconductive adhesive or by welding.

The number of batteries (e.g., battery cells) to be stacked may be three or more. Desired battery properties can be obtained by changing the number of batteries to be stacked.

Note that as illustrated in FIG. 10, the sides of the battery 2100 may be covered by the second sealing section 320. The stacked state of a plurality of batteries can thereby be maintained stably in the battery 2100.

When structuring a stacked battery, parallel connection and serial connection can be used in combination to obtain desired battery properties. As a result, a battery with a small volume and a high capacity can be realized.

Figure 11:
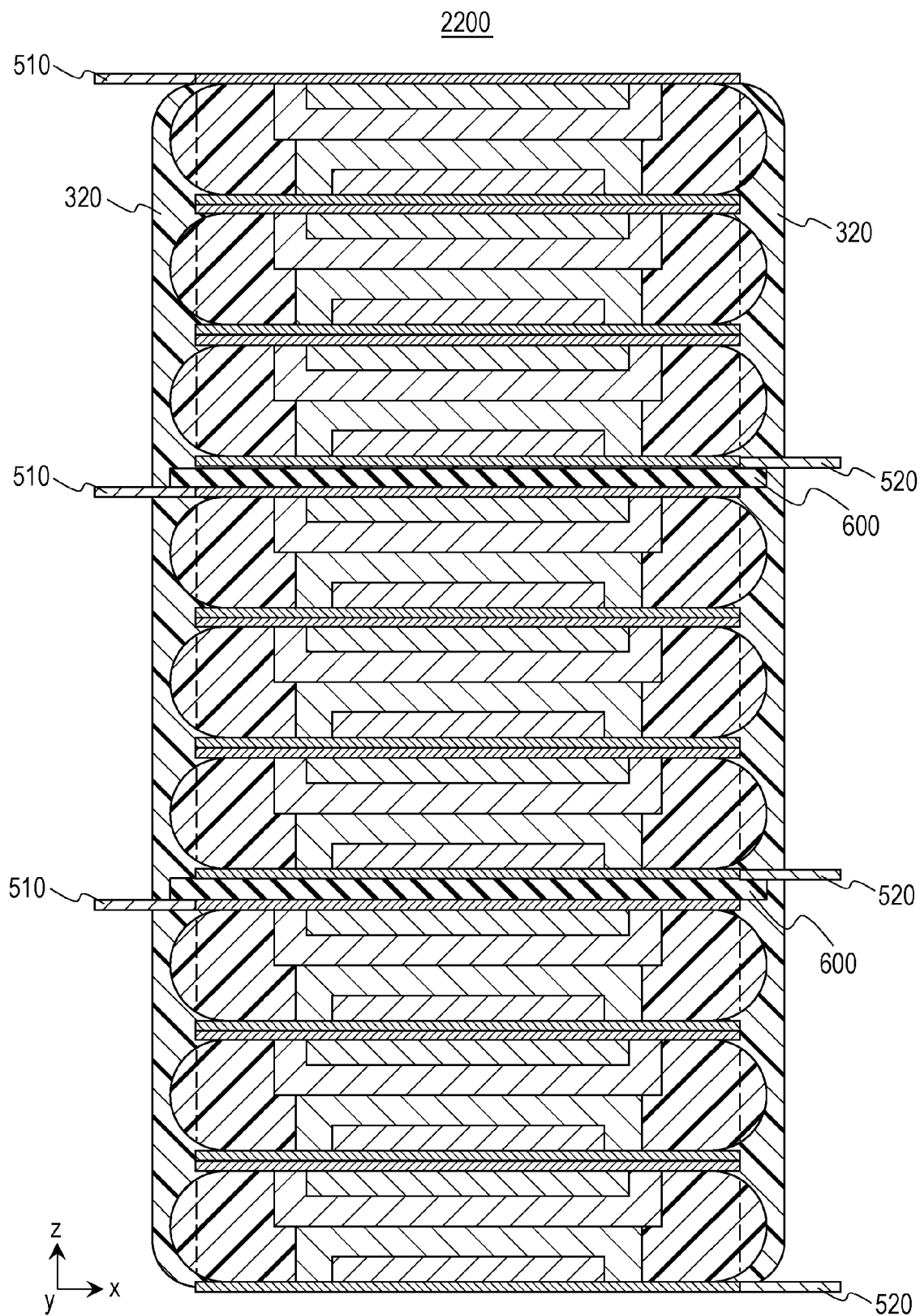
FIG. 11 is an xz view (sectional view) illustrating a general configuration of a battery according to Embodiment 2.

FIG. 11 is an xz view (sectional view) illustrating a general configuration of a battery 2200 according to Embodiment 2.

FIG. 11 illustrates an example of a method of combining the parallel connection with the serial connection when the voltage provided by three battery units connected in series is required.

In the battery 2200 according to Embodiment 2, three sets of stacked batteries each of which has three battery units that are connected in series are connected in parallel with each other with an insulation separator 600 interposed between adjacent stacked batteries. Electrode leads 510 and counter-electrode leads 520 are connected to the electrode current collectors 210 and the counter-electrode current collectors 220, respectively. A set of stacked batteries and another set of stacked batteries are stacked with the separator 600 interposed therebetween. Note that the sets of stacked batteries can be joined firmly to each other in the battery 2200 by forming the second sealing section 320.

Figure 12:
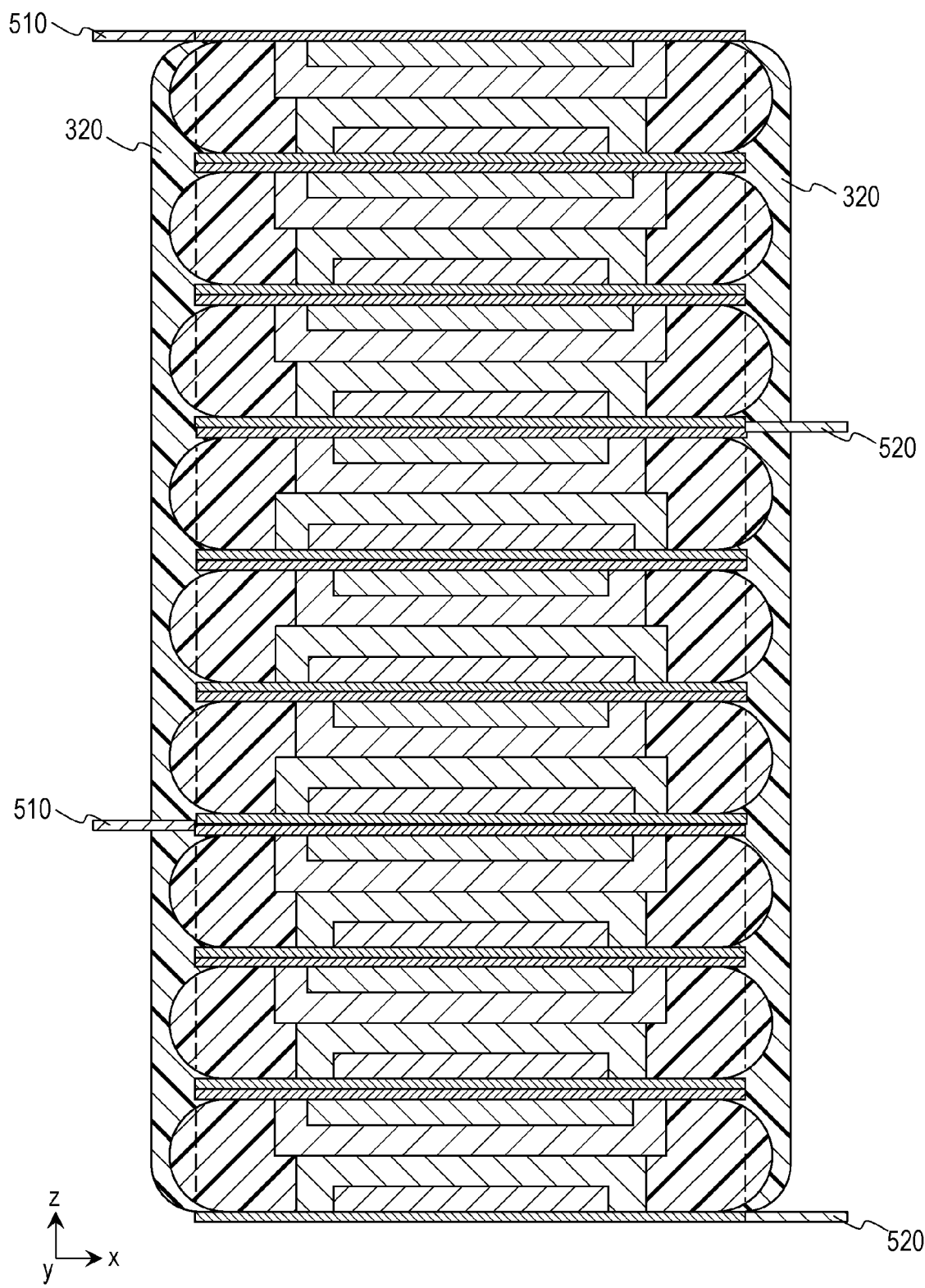
FIG. 12 is an xz view (sectional view) illustrating a general configuration of a battery according to Embodiment 2.

FIG. 12 is an xz view (sectional view) illustrating a general configuration of a battery 2300 according to Embodiment 2.

FIG. 12 illustrates another example of a method of combining the parallel connection with the serial connection when the voltage provided by three battery units connected in series is required.

In the battery 2300 according to Embodiment 2, three sets of the stacked batteries each of which has three battery units connected in series are joined while the electrode current collectors 210 are joined to each other (and the counter-electrode current collectors 220 are also joined to each other). The three sets of the stacked batteries are electrically connected in parallel to each other. Note that the three sets of the stacked batteries can be joined firmly to each other in the battery 2300 by forming the second sealing section 320. When compared with the battery 2200, the battery 2300 requires none of the separators 600 and less number of the electrode leads 510 and of the counter-electrode leads 520. This realizes cost reduction and simplification in the manufacturing process. Moreover, a battery with a small volume and a high capacity can be realized.

The batteries that are stacked and connected to each other may be packed in a sealing case. A generally known case (for example, laminated bag, metal can, or resin case) can be used as the sealing case. Deterioration of the electricity-generating element 100 due to moisture can be prevented by using the sealing case.

Method of Manufacturing Battery

An example of a method of manufacturing the battery according to the disclosure will be described below.

Figure 13:
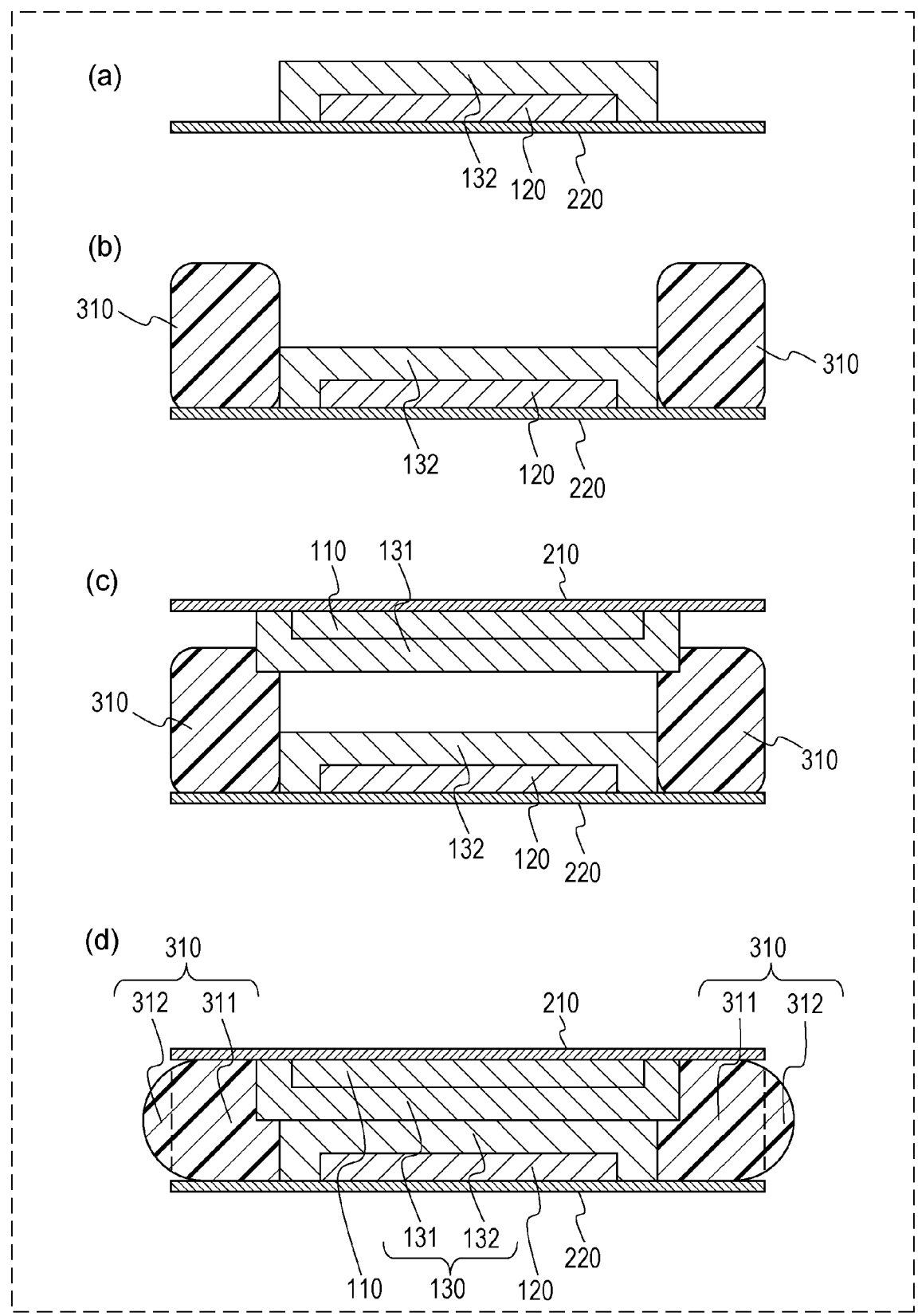
FIG. 13 is a view illustrating an example of a method of manufacturing a battery.

FIG. 13 is a view illustrating an example of a method of manufacturing the battery.

First, a paste-like paint in which the counter-electrode material is mixed with a solvent is provided. The paint is applied onto the counter-electrode current collector 220 (i.e., the counter-electrode layer 120 is formed). The solid electrolyte material is subsequently applied onto the counter-electrode current collector 220 so as to cover the applied paint and is dried (i.e., the counter-electrode-side electrolyte layer 132 is formed). A counter-electrode plate as illustrated in FIG. 13($a$) is thus produced. Note that the counter-electrode material (and the electrode material) and the solid electrolyte material may be provided as materials containing no solvent.

Next, as illustrated in FIG. 13($b$), the first material is applied onto a peripheral area on the counter-electrode plate (i.e., the first sealing section 310 is formed). At this time, as illustrated in FIG. 13($b$), the first material may be applied thickly such that the thickness of the first sealing section 310 is larger than the sum of the thicknesses of the counter-electrode layer 120, the counter-electrode-side electrolyte layer 132, the electrode layer 110, and the electrode-side electrolyte layer 131. Moreover, the paint can be subjected to temporary curing by performing heat treatment or ultraviolet radiation after application so as to increase the viscosity of the paint without losing fluidity. Deformation of the first sealing section 310 can be controlled by using the temporary curing for increasing the viscosity.

Next, a paste-like paint in which the electrode material is mixed with a solvent is provided. The paint is applied onto the electrode current collector 210 (i.e., the electrode layer 110 is formed). The solid electrolyte material is subsequently applied onto the electrode current collector 210 so as to cover the applied paint and is dried (i.e., the electrode-side electrolyte layer 131 is formed). An electrode plate as illustrated in FIG. 13($c$) is thus produced.

Next, as illustrated in FIG. 13($c$), the electrode plate is placed so as to oppose the counter-electrode plate on which the first sealing section 310 has been formed, and the electrode plate and the counter-electrode plate are subsequently pressed and bonded together.

At this time, the first sealing section 310, which has fluidity, deforms as illustrated in FIG. 13($d$) and subsequently protrudes outside from the edges of at least one of the electrode current collector 210 and the counter-electrode current collector 220. Note that after the first sealing section 310 deforms, the first sealing section 310 may be hardened completely by using, for example, heat treatment or ultraviolet radiation. This can improve a sealed state.

As described above, the method of manufacturing the battery according to the disclosure includes a step of forming the first sealing section 310 before the electrode plate and the counter-electrode plate are joined to each other. The first sealing section 310 is thereby formed on the outside of at least one of the electrode current collector 210 and the counter-electrode current collector 220. This can substantially reduce the risk of short-circuiting between the electrode layer 110 and the counter-electrode layer 120, which is caused by direct contact between the electrode current collector 210 and the counter-electrode current collector 220.

Here, controlling the thickness of the first sealing section 310 is a key factor to improve the reliability of the battery. The thickness of the first sealing section 310 is controlled by adjusting the application thickness of the first sealing section 310. Here, the application thickness of the first sealing section 310 may be adjusted so as not to cover most of the edges of the electrode current collector 210 and the counter-electrode current collector 220 (so as not to spill).

For example, the battery 1600 can be produced in accordance with an exemplary manufacturing method described above.

Each of the batteries described in Embodiment 1 can be produced by adjusting, for example, the location to which the first sealing section 310 is applied, the areas in which the electrode layer 110, the counter-electrode layer 120, and the electrolyte layer 130 are formed, and the sizes of the electrode current collector 210 and the counter-electrode current collector 220.

Each of the batteries described in Embodiment 2 can be produced by stacking a plurality of batteries and by forming the second sealing section 320.

In the method of manufacturing the battery according to the disclosure, when joining the electrode plate and the counter-electrode plate or when stacking a plurality of batteries, these plates or batteries may be pressed together. In this case, the areas and thicknesses of the layers to which pressure is applied may be equal to each other. Accordingly, the pressure applied to each layer becomes constant. This enables the layers to be adhered uniformly while each layer is filled densely. In the case of the battery (or the stacked battery) according to the disclosure, the thickness (and the area) of each layer to which pressure is applied during pressing can be made to be substantially uniform. The properties of each battery unit can be thereby made uniform. As a result, a serial-connection stacked battery can be reliably made into a high capacity battery.

Note that in the battery according to the disclosure, the thickness of the first portion 311 may be equal to or larger than the thickness of the electricity-generating element 100. For example, the thickness of the first portion 311 may be equal to that of the electricity-generating element 100. In other words, the thickness of the first portion 311 may be equal to the distance between the electrode current collector 210 and the counter-electrode current collector 220 in the opposing region 400.

With the configuration described above, the distance between the electrode current collector 210 and the counter-electrode current collector 220 while manufacturing and using the battery can be maintained by the first portion 311 to the thickness of the electricity-generating element 100 or more. Thereby, change in distance between the electrode current collector 210 and the counter-electrode current collector 220 can be suppressed. As a result, the risk of the electrode layer 110 and the counter-electrode layer 120 being short-circuited can be further reduced. Moreover, the pressing pressure can be controlled and adjusted easily when batteries are stacked with pressure in the battery manufacturing process (for example, batteries can be pressed while applying a uniform pressure onto the entire surface thereof).

The battery according to the disclosure can be applied as a battery (for example, all-solid-state rechargeable battery) for electronic devices, electric appliances and devices, electric vehicles, or the like.

What is claimed is:

1. A battery comprising:
    an electricity-generating element that includes an electrode layer and a counter-electrode layer;
    an electrode current collector that is disposed in contact with the electrode layer;
    a counter-electrode current collector that is disposed in contact with the counter-electrode layer; and
    a first sealing section that includes a first portion and a second portion, wherein
    the first portion is positioned within an opposing region where the electrode current collector and the counter-electrode current collector oppose each other and is in contact with the electrode current collector and the counter-electrode current collector,
    the second portion is positioned outside the opposing region,
    the second portion is positioned outside both an edge of the electrode current collector and an edge of the counter-electrode current collector so that the second portion does not overlap the electrode current collector in a direction perpendicular to the longitudinal direction of the electrode current collector, and does not overlap the counter-electrode current collector in a direction perpendicular to the longitudinal direction of the counter-electrode current collector, and
    the direction perpendicular to the longitudinal direction intersects both the electrode current collector and the counter-electrode current collector.

2. The battery according to claim 1, wherein the first portion has a thickness larger than or equal to a thickness of the electricity-generating element.

3. The battery according to claim 1, wherein
    the first portion surrounds the electricity-generating element, and
    the second portion surrounds the first portion.

4. The battery according to claim 1, wherein the second portion covers neither the edge of the electrode current collector nor the edge of the counter-electrode current collector.

5. The battery according to claim 1, wherein the first portion is in contact with the electricity-generating element.

6. The battery according to claim 1, further comprising a second sealing section, wherein
    the second sealing section is disposed in contact with the first sealing section,
    the first sealing section is positioned between the electricity-generating element and the second sealing section,
    the first sealing section contains a first material,
    the second sealing section contains a second material, and
    the second material is different from the first material.

7. The battery according to claim 1, wherein
    the first sealing section contains a first material, and
    the first material has an electrical insulation property and does not have ionic conductivity.

8. The battery according to claim 7, wherein the first material is at least one of epoxy resin, acrylic resin, polyimide resin, and silsesquioxane.

9. The battery according to claim 1, wherein the first sealing section includes a metal oxide material in granular form.

10. The battery according to claim 1, wherein the second portion does not overlap either the electrode current collector or the counter-electrode current collector in plan view.

* * * * *